Figure 1:
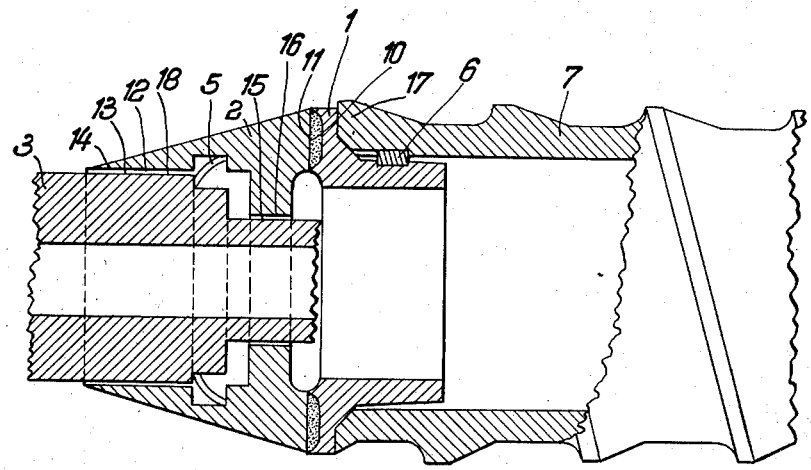

Oct. 23, 1956

Z. LORENIAN 2,767,430

PACKING FOR SCREW EXTRUSION PRESSES

Filed Aug. 26, 1954

Inventor:
Zareh Lorenian
By:
Attorney

United States Patent Office 2,767,430
Patented Oct. 23, 1956

2,767,430

PACKING FOR SCREW EXTRUSION PRESSES

Zareh Lorenian, Milan, Italy

Application August 26, 1954, Serial No. 452,367

Claims priority, application Germany August 29, 1953

6 Claims. (Cl. 18—12)

Screw extrusion presses with a tubular-shaped screw are provided with a packing in order to prevent the material which is conveyed from flowing back into the interior of the screw.

All of the known gaskets or packings of this kind have various disadvantages and inadequacies, and none of the conventional packings, or gaskets is provided with a continuous, perfect seal, particularly when thermoplastics, or thermosetting plastics, or compounds containing these plastics are extruded.

The purpose of the invention is the creation of a packing or a gasket for the purpose described, which will prevent the material, particularly thermoplastics or thermosetting plastics, or compounds containing such plastics, from flowing back into the interior of the screw. One of the particular advantages of this gasket, in addition to its simplicity, is the fact that it operates properly irrespective of pressure and heat fluctuations of the material and of the screw extrusion press and of the plasticity variations of the material.

The attached drawing represents schematically an example of a packing or gasket conforming to the invention. This drawing, which is given as an example, is not intended in any way to restrict the idea upon which the invention is based.

Figure 2:
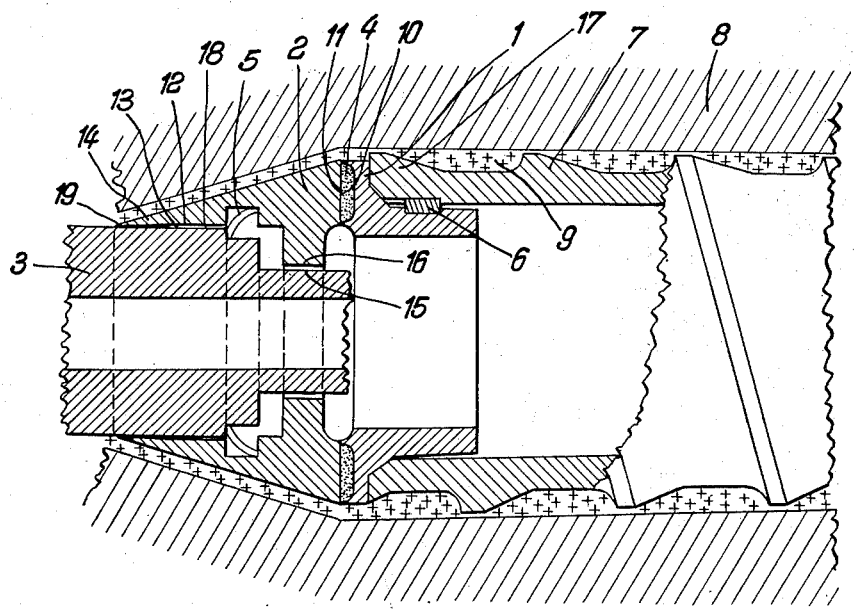

In the drawing:

Fig. 1 is an axial section taken at the delivery end of a tubular-shaped screw provided with a packing constructed according to one embodiment of this invention, the assembly being shown before the start of the operation of the screw extrusion press and in a state of no load, that is, without any material in the screw or within the zone of the packing; and Fig. 2 is an axial section similar to Fig. 1 but showing also fragmentarily the cylinder in which the screw operates, and showing the assembly during the operation of the screw under load, that is, with the material in the screw and within the zone of the packing.

This invention consists in a packing or seal which is characterised by the following features:

(a) That a part of the packing consists preferably of a ring-shaped part 1 which is located at the material delivery end of a tubular-shaped screw and has its sealing surface arranged in a radial direction to the longitudinal axis of the screw, (b) That a part 2 of the packing is preferably a ring-shaped part, that is preferably conical and that has an outside surface tapered in the direction of the flow of the material and that has a sealing surface which acts radially on its side facing the screw, the sealing surface being adjusted to the angle of the sealing surface of part 1 and together with the latter forming the radial seal; that part 2 is at least axially movable and has at least one part of its interior surface sliding on a guide; that the closing of the packing is effected by the back pressure of the material and that the radial sealing surface of part 2 is thereby pressed against the radial sealing surface of part 1, (c) That part 2 has a preferably ring-shaped axial guiding and sealing surface over a specific length in its interior at its end opposite to the radial sealing surface; that this surface, together with the outside surface of a part 3, which is adapted to this purpose, forms a sealing surface in the axial direction; that in the state of unloaded condition there is a slight play between the inside diameter of the preferably ring-shaped guiding and sealing surface of part 2 and the outside surface of part 3; that in the loaded condition the tapered end part of part 2 is so pressed elastically through the pressure of the material which is conveyed by the screw against the peripheral surface of part 3, that at least one part of the length of the inside axial sealing surface of part 2 will be pressed against the outside sealing surface of part 3, so that part 2 and part 3 form together a seal or a packing and that the return flow of the material is made impossible.

Part 1 of the packing may consist of a preferably ring-shaped part which is applied in or at the material delivery end of the tubular-shaped screw, or it may also be made integral with the screw.

As there is no back pressure caused by the material when the press screw is initially set into operation and there is then not yet any load, it is essential to prevent at this time penetration of the material between the radial sealing surfaces of part 1 and part 2. During the initial period of operation, the closing of the packing until the back pressure of the material has built itself up can be effected by known means, for example by means of annular springs, spiral springs or similar means, which will press the radial sealing surface of part 2 against the radial sealing surface of part 1.

Part 2 of the packing may be designed in such a manner that, in addition to its mobility in the axial direction, it can turn freely. It may sometimes be correct, however, to secure part 2 of the packing against rotation, by using known means.

The sealing surfaces arranged radially and/or axially are made of any suitable kind of sealing material having good sliding properties, so that, for example, carbon will run against steel, steel against steel with different degrees of surface hardness, steel against cast-iron, steel against non-ferrous metals. However it is possible to use also for the radial and/or axial sealing surfaces synthetic resins which run against steel or non ferrous metals or synthetic resins or plastics.

In the drawing, the tubular-shaped screw is designated by the numeral 7, the screw cylinder by 8 and the material, or the thermoplastic or the thermosetting resin or plastic, or the compound containing such plastics, by 9. The material delivery end of the tubular-shaped screw, designated by numeral 17, has the ring-shaped part 1 located in or on it and the latter is connected with the screw by means of wedge gib 6 in such a manner that it will turn with the screw. This part may also be made integral with the screw.

The sealing surface 10 of part 1 is arranged in a radial direction to the longitudinal axis of the screw 7. The sealing surface 10 of part 1 consists of the body of carbon 4, but it may also be made of steel, cast iron or of one of the known kind of sealing materials with good sliding properties, so that in spite of a high specific surface pressure a not too high and undue heating of the packing will result; it may, however, also preferably be made of plastics. The sealing surface 10 of part 1 runs or slides on the radially arranged sealing surface 11 of part 2, the angle of which is accommodated to angle of sealing surface 10 of part 1, so that these two surfaces will together form the radial packing or seal. The sealing surface 11 of part 2 may be made of steel, cast iron, a non-ferrous metal or a similar material, but the hardness of the two sealing surfaces should preferably be different from each other in order to ensure good sliding or running properties and to avoid blocking. The sealing surfaces of this packing may be provided with continuous or intermittent lubrication by known means and equipment.

Part 2 of the packing, which is at least axially movable, is ring-shaped and has a conical taper in the direction of the flow of the material, it has a lip-shaped design at its end 14 opposite to its radial sealing surface, and has in its interior along a specific length a ring-shaped axial guiding and sealing surface 12, which together with the outside surface 13 of part 3 constitutes a sealing surface in the axial direction. In addition, part 2 has also an axial guiding surface 16 which slides on surface 15 of part 3.

In order to keep the packing closed in the state of no load until the back pressure of the material is built up, an annular spring 5 or a different known means of device is arranged between parts 2 and 3, which presses the axially movable part 2 with its radial sealing surface 11 against the radial sealing surface 10 of part 1 and provides an initial stress between these two surfaces.

The method of operation of the packing is as follows:

At the start of the operation, the part 2 is pressed against part 1 by means of the annular spring 5 or for an initial stress between these two parts, and there is a slight play 18 between the inside surface 12 of lip 14 of part 2 and the outside surface 13 of part 3. After the material 9 has been conveyed through the screw and has reached the zone of the packing, and a pressure is resulting through the conveying of the material in this zone and the back pressure of the material has built up, the part 2 with its sealing surface 11 is pressed against the sealing surface 10 of part 1 by the back pressure of the material 9 against the conical or tapered surface of part 2, and the radial sealing surface is thereby kept closed. At the same time this material 9 presses the tapered, lip-shaped end part 14 of part 2 together elastically, so that its inside surface 12 forms a seal or a packing together with the correspondingly designed outside surface 13 of part 3, as shown at 19, and the penetration of the material 9 at this point is also made impossible.

It depends on the amount of the pressure exerted by the material 9, on the wall thickness of the tapered, lip-shaped end part 14 of part 2, on the nature and length of the tapering, on the elasticity of the material of which part 2 is made, and on the amount of play between the inside surface 12 of the tapered, lip-shaped end part 14 of part 2 and the outside surface 13 of part 3 to establish the length of this axial sealing surface 19 in loaded condition.

The amount of the pressure or the initial stress with which the radial sealing surface 11 of part 2 presses against the radial sealing surface 10 of part 1 in the state of no load depends upon the strength of the annular spring 5.

Having described my invention, what I claim is:

1. In a screw extrusion press having a casing and a tubular press screw revolvable in said casing, the combination of a sealing device comprising a first ring-shaped part positioned in the delivery end of said screw and having a sealing surface radial of the longitudinal axis of the screw, a second ring-shaped part disposed in front of said first ring-shaped part in the direction of flow of the material, said second ring-shaped part having a sealing surface at its rear which is radial of the longitudinal axis of said screw and which is opposed to the sealing surface of the first ring-shaped part and which together with the sealing surface of said first part forms a radial seal, a guide, said second ring-shaped part being slidable axially on said guide, said second ring-shaped part having an outside surface tapered in the direction of flow of the material whereby back pressure of the material will force said second part to slide rearwardly on said guide so that the radial sealing surface of the second part will be forced against the radial sealing surface of the first part to close said radial seal, said second part having an internal, annular guiding and sealing surface at its forward end which converges forwardly with respect to the tapered outside surface of said second part to form a flexible lip, an annular member having an external guiding and sealing surface to cooperate with said internal, annular guiding and sealing surface to form an axial seal, said internal surface being spaced radially slightly from said external guiding and sealing surface when there is no load on the parts, and said lip being pressed by the back pressure of the material being fed by the screw against said external guiding and sealing surface when the parts are under load to prevent back flow of the material.

2. A packing according to claim 1 in which said first ring-shaped part is integral with the screw.

3. A packing according to claim 1 in which means is provided for continuously pressing the radial sealing surface of the second ring-shaped part against the radial sealing surface of the first ring-shaped part to close the radial seal.

4. A packing according to claim 1 in which the second ring-shaped part is mounted to rotate freely relative to said first ring-shaped part.

5. A packing according to claim 1 in which in each pair of cooperating sealing surfaces, the respective sealing surfaces are made of different materials that are readily slidable on one another.

6. A packing according to claim 1 in which the several sealing surfaces are lubricated.

References Cited in the file of this patent

UNITED STATES PATENTS

| Number | Name | Date |
|---|---|---|
| 490,110 | Goodfellow | Jan. 17, 1893 |
| 902,850 | Auchu | Nov. 3, 1908 |
| 1,322,464 | Oden | Nov. 18, 1919 |
| 1,533,191 | Kaiser et al. | Apr. 14, 1925 |
| 2,478,018 | Sittner | Aug. 2, 1949 |